United States Patent

[11] 3,561,676

| [72] | Inventor | Lynn G. Amos |
| | | Powell, Tenn. |
| [21] | Appl. No. | 787,517 |
| [22] | Filed | Dec. 27, 1968 |
| [45] | Patented | Feb. 9, 1971 |
| [73] | Assignee | Corning Glass Works |
| | | Corning, N.Y. |
| | | a corporation of New York |

[54] FLUIDIC NUMERIC COMMUNICATOR
9 Claims, 3 Drawing Figs.

[52] U.S. Cl. ............................................. 235/201, 116/129
[51] Int. Cl. .............................................. G06m 1/24
[50] Field of Search ............................. 235/201, 200; 137/81.5; 116/129

[56] References Cited
UNITED STATES PATENTS

| 3,239,142 | 3/1966 | Levine | 235/201 |
| 3,364,342 | 1/1968 | Jakubowski | 235/201 |
| 3,442,447 | 5/1969 | Proctor | 235/201 |
| 3,480,208 | 11/1969 | Goodykoontz | 235/201 |

*Primary Examiner*—Richard B. Wilkinson
*Assistant Examiner*—Lawrence R. Franklin
*Attorneys*—Clarence R. Patty, Jr., Walter S. Zebrowski and William J. Simmons, Jr.

ABSTRACT: A fluidic numeric display device which receives a digitally coded output from a fluidic circuit such as a counter and displays its numerical equivalent. A rotatable numbered cylinder is coded by means of a plurality of slots to provide a coded fluidic output which is indicative of the numeral appearing in an indexing window adjacent the cylinder. The initially rotating cylinder is stopped when the coded output therefrom is identical with the coded signal. Furthermore, a desired number can be indicated to a fluidic circuit by manually rotating the numbered cylinder to the desired number. The device will translate the setting into a fluidic code.

INVENTOR.
Lynn G. Amos
BY William J. Simmons
ATTORNEY

3,561,676

FLUIDIC NUMERIC COMMUNICATOR

BACKGROUND OF THE INVENTION

This invention relates generally to fluidic systems and more particularly to an improved input-output device for use in fluidic circuits.

Fluidic circuits are being increasingly utilized in the fields of computation, automation and control. These fluidic circuits employ logic elements to perform mathematical and decisional operations. Since the signals on which these functions are performed are in the form of a digital code, means must often be provided for indicating the decimal equivalent of the resultant coded signals. It is advantageous that such output devices be fluid operated, have few moving parts, and that they be fast acting.

U.S. Pat. No. 3,249,302 issued to R. E. Bowles discloses various types of visual readout devices wherein any one of the 10 numerals 0 through 9 can be individually displayed. One of these types requires one fluidic signal for each of the 10 numerals to be displayed. Another relates to matrix displays which require 35 fluidic signals to produce a 5 ×7 matrix display or 7 fluidic signals to produce a bar matrix display. Still another visual readout device requiring 10 fluidic signals in order to display 10 numerals is disclosed in U.S. Pat. No. 3,305,171 issued to E. R. Phillips et al. A number of disadvantages are inherent in the hereinabove described readout devices. Depending on the particular readout device, from 7 to 35 fluidic signals are required to produce the numerals 0 to 9. A fluidic device such as a computer or a counter which operates on a digital code would require some type of converter to convert the digitally coded fluidic signal into the required plurality of fluid signals necessary to operate these readout devices.

SUMMARY OF THE INVENTION

It is therefore an object of this invention to provide an improved numerical display device for fluidic circuits.

Another object is to provide means for quickly displaying the numerical equivalent of a fluidic binary coded signal.

Another object of this invention is to provide a fluidic device for translating a decimal number into a fluidic digitally coded signal.

Briefly, this invention comprises rotatable means for generating a first fluidic digitally coded signal which corresponds to the angular orientation thereof, and means for rotating the rotatable means. Means are provided for comparing the first fluidic signal with a second fluidic digitally coded signal and providing an output fluidic signal which indicates the equivalence of the first and second signals. When the two fluidic signals are equivalent, the motion of the rotatable means is arrested.

DETAILED DESCRIPTION

Figure 1:
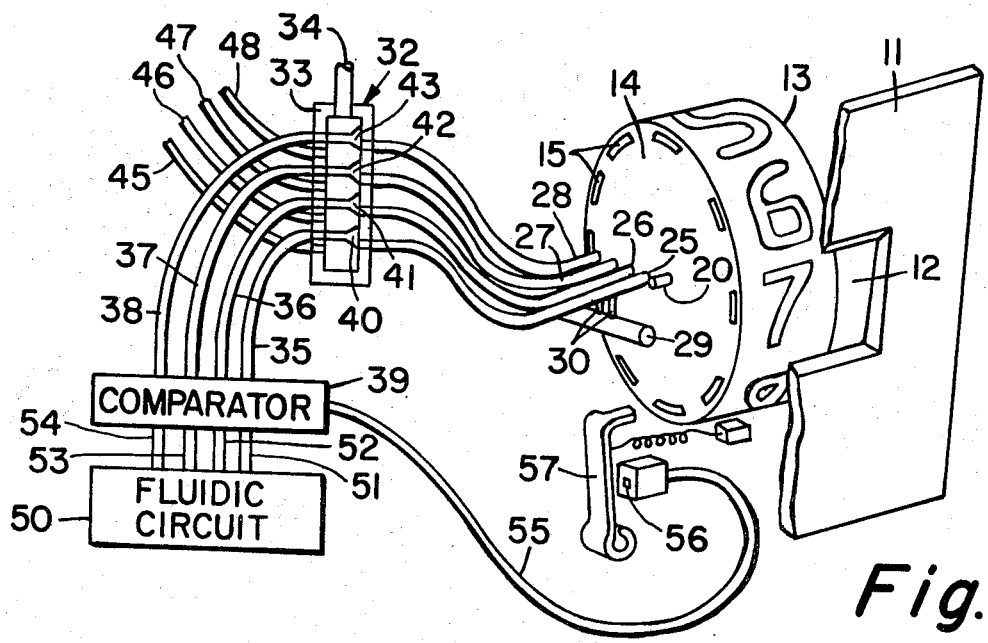
FIG. 1 is an oblique view showing a fluidic numeric communicator in accordance with the present invention.
Figure 2:
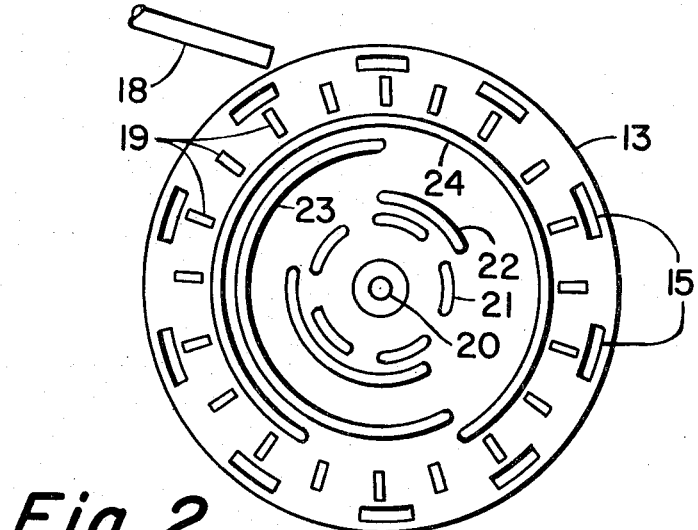
FIG. 2 is a side elevation of the rotatable cylinder which is shown in FIG. 1 but which, for the sake of clarity, is not shown in complete detail in FIG. 1.

Referring to FIGS. 1 and 2 there is shown a display panel 11 having a window 12 therein, a portion of the panel being cut away to expose a numbered cylinder 13 which is so disposed with respect to the panel that one of the 10 numerals located around the circumference thereof can be displayed at any given time in the window 12. The side 14 of the cylinder 13 is shown in FIG. 1 to contain a plurality of notches 15 near the periphery thereof; for the sake of clarity other details of the side 14 are shown only in FIG. 2. Fluid from a jet 18 continuously impinges upon fins 19 which are located near the periphery of the side 14 to cause the cylinder 13 to rotate about a shaft 20 upon which it is mounted. Four sets of coded annular slots 21—24 are concentrically located in the surface 14. The slots 21 through 24 are shown in FIG. 2 to be arranged in accordance with a binary code; however, any digital code could be used as long as it is compatible with the fluidic circuit with which it is associated.

Four pipes 25 through 28 terminate adjacent the side 14 and are aligned with the sets of annular slots 21 through 24, respectively. Each of the pipes 25 through 28 is connected to a pipe 29 by a plurality of pipes 30. The ends of the pipes 25 through 28 opposite the side 14 terminate at a switch 32 which consists of a stationary member 33 and a movable member 34. Funnel-shaped channels 40 through 43 in the movable member 34 are so disposed that they are always in receiving relationship with respect to fluid flowing from the pipes 25 through 28, respectively, but they convey the fluid to the pipes 35 through 38 or the pipes, 45 through 48, respectively, depending on the position of the movable member 34. When the movable member is in the position shown, the pipes 25 through 28 are coupled to the pipes 35 through 38, respectively, which are connected to a comparator 39. When the movable member 34 is moved downwardly, the channels 40 through 43 couple the pipes 25 through 28 to the pipes 45 through 48, respectively.

Four fluidic digital output signals from a fluidic circuit 50 are also coupled to the comparator by pipes 51 through 54. The output from the comparator is coupled by a pipe 55 to a slot 56. A detent arm 57 is spring loaded so that the movable end thereof is biased toward the side 14 of the numbered cylinder in alignment with the slots 15.

The pipe 29 supplies fluid under pressure to the pipes 25 through 28 by way of the pipes 30. When a slot from one of the sets of slots 21 through 24 appears adjacent the open end of one of the pipes 25 through 28, respectively, the back pressure in that particular pipe drops. Therefore, assuming that a relatively high pressure is a "1" and relatively low pressure is a "0", a fluidic digital code will appear in the pipes 25 through 28 which corresponds to the numeral appearing in the window 12.

The device thus described can function as either an input or an output device for a digital fluidic circuit. For operation as an input device, an operator may enter a number into a fluidic circuit by releasing the detent arm 57 either manually or by using a mechanical or auxiliary fluidic releasing mechanism and thereafter manually turning the numbered cylinder until the desired number appears in the window 12. The fluidic code corresponding to the selected number appears at the pipes 25 through 28. With the switch 32 in the position opposite that illustrated in FIG. 1, this digital fluidic signal will be coupled to a fluidic circuit by way of the switch 32 and the pipes 45 through 48.

When it is desirable to display the numerical equivalent of a digital code which is supplied by a fluidic circuit 50, the operation is as follows. The switch 32 is moved to the position shown in FIG. 1. Fluid emanating from the nozzle 18 impinges on the fins 19 and continually rotates the cylinder, thereby continually generating digital codes which correspond to the numerals momentarily appearing in the window 12. This digital fluidic code is coupled to the comparator 39 by the pipes 35 through 38 and is compared with the output from the fluidic circuit 50 which appears in the pipes 51 through 54. The comparator 39 provides a fluid output signal when the fluid digital signals appearing in the pipes 35 through 38 do not correspond to those appearing in pipes 51 through 54, respectively. The fluid output from the comparator is coupled by a pipe 55 to a slot 56 from which it impinges on the detent arm 57 and forces it away from the numbered cylinder 13. When the fluidic digital code from the cylinder corresponds to that from the fluidic circuit 50, the fluid output from the comparator ceases, thus permitting the spring biased detent arm to engage one of the slots 15 which is adjacent thereto at that particular time.

Figure 3:
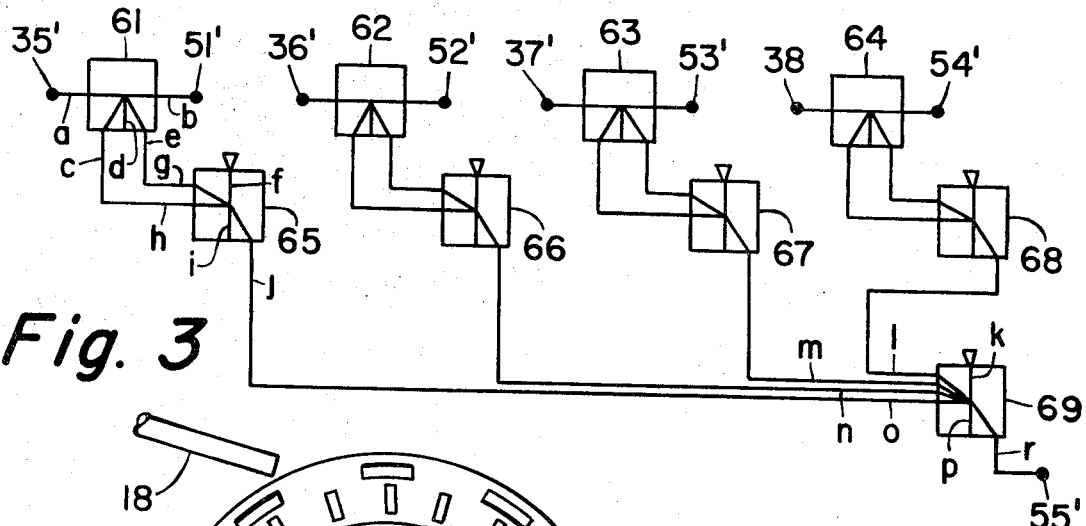
FIG. 3 is a schematic diagram of a fluidic circuit which may be utilized to perform the function of the COMPARATOR which is shown in block diagram form in FIG. 1.

One of the various fluid logic circuits which can perform the function of the comparator 39 is illustrated in FIG. 3. The terminations of the pipes 35 through 38 and 51 through 54 of FIG. 1 are illustrated in FIG. 3 as terminals having primed reference numerals. The fluid logic circuit of FIG. 3 comprises four passive AND gates 61 through 64, each of which comprises two input channels $a$ and $b$ and three output channels $c$, $d$ and $e$. As is well-known, a fluid stream applied to only one of the input channels $a$ or $b$ passes undeflected and exits from a respective one of the channels $e$ or $c$. It is only when input streams are concurrently applied to channels $a$ and $b$ that a fluid output appears in channel $d$. The output channels $c$ and $e$ of each of the AND gates 61 through 64 are connected to the two input channels $g$ and $h$ of the OR/NOR gates 65 through 68, respectively, each of which also comprises a power stream input channel $f$, a stable outlet passage $i$ and an unstable outlet passage $j$. In the absence of a fluid input signal at either of the input channels $g$ or $h$, the power stream flows from the stable outlet channel $i$, but a fluid signal appearing at either of the input channels $g$ or $h$ diverts the power stream so that it flows from the unstable outlet channel $j$. The unstable outlet channels $j$ of the OR/NOR gates 65 through 68 are respectively connected to the input channels $l$, $m$, $n$, and $o$ of a four input fluidic NOR gate 69 which also comprises a power stream inlet channel $k$, a stable outlet channel $p$ and an unstable outlet channel $r$. In the absence of a fluid signal at any of the input channels $l$, $m$, $n$ or $o$, the power stream flows from the stable outlet channel p. However, if a fluid signal exists at any one of the input channels, the power stream is diverted to the unstable outlet channel $r$ which is connected to the outlet terminal 55'.

The operation of this circuit is such that if dissimilar signals appear at the input terminals $a$ and $b$ of one or more of the AND gates 61 through 64, an output signal from that AND gate deflects the power stream of the respective OR/NOR gates 65 through 68 so that an output signal appears at its outlet channel $j$. An output signal from the unstable outlet channel $j$ of one or more of the OR/NOR gates will cause an output to exist at the outlet channel r of the four input NOR gate 69. Thus, if the digital code appearing at the pipes 35 through 38 does not correspond with that appearing in the pipes 51 through 54, a fluid output is coupled from the comparator outlet terminal 55' to the detent arm 57 by the pipe 55 and the slot 56, therefore preventing the detent arm from engaging any of the slots 15 at that time. When two "1's" or two "0's" appear at the input terminals of each of the AND gates 61 through 64, no fluid output appears at the outlet channel r of the four input NOR gate 69. Since no fluid is supplied to the slot 56, the detent arm 57 is permitted to engage an adjacent slot 15.

In the event of a fluid power failure the detent 57 illustrated in FIG. 1 remains spring biased in one of the slots 15 so that the displayed number remains locked in position. In an alternative method of operation, the detent could be normally biased away from the slots 15 and forced into one of the slots by a fluid signal which is obtained when the digital code appearing in the pipes 35 through 38 corresponds to that appearing in the pipes 51 through 54. Such a fluid signal can be obtained from the outlet passage $p$ of the NOR gate 69.

While the preferred embodiment of this invention has been illustrated and described, it is obvious that variations of the details of construction may be resorted to without departing from the true spirit and scope of the invention as defined by the appended claims.

I claim:
1. A fluidic numeric communicator comprising:
 rotatable means for generating a first fluidic digitally coded signal which corresponds to the angular orientation thereof;
 fluid motor means for rotating said rotatable means by continuously exerting a rotational force thereon;
 means for comparing said first fluidic signal with a second fluidic digitally coded signal and providing an output fluidic signal which indicates the equivalence of said first and second signals; and
 means including a fluid operated mechanical brake for arresting the rotation of said rotatable means in response to said output fluidic signal.
2. A fluidic numeric communicator in accordance with claim 1 wherein said rotatable means comprises a cylinder having a plurality of slots on one surface thereof, said slots being arranged in accordance with a digital code, and fluidic means arranged adjacent the path of said slots for providing a fluidic signal which is indicative of the absence or presence of a slot adjacent thereto.
3. A fluidic numeric communicator in accordance with claim 2 wherein said slots are concentrically arranged in an end surface of said cylinder, and said fluidic means comprises a plurality of pipes the ends of which terminate adjacent the path traveled by said rotating slots.
4. A fluidic numeric communicator in accordance with claim 3 which further comprises means for supplying said pipes with fluid under pressure, the back pressure in each of said pipes dropping when a slot appears at said first end thereof.
5. A fluidic numeric communicator in accordance with claim 4 which further comprises a plurality of numerals on the cylindrical surface of said cylinder, and indexing means adjacent the path of said numerals, said first fluidic coded signal corresponding to the numeral appearing adjacent said indexing means.
6. A fluidic numeric communicator in accordance with claim 5 wherein said means for rotating comprises a plurality of fins disposed around a surface of said cylinder, and means for providing a fluid jet which impinges upon said fins.
7. A fluidic numeric communicator in accordance with claim 6 wherein said arresting means comprises a detent arm for engaging said cylinder in response to said output fluid signal.
8. A fluidic numeric communicator in accordance with claim 7 wherein said detent arm is normally biased for engagement with said cylinder, said comparator output fluid signal impinging upon said detent arm and disengaging said detent arm from said cylinder when said first and second signals do not correspond.
9. A fluidic numeric communicator in accordance with claim 3 which further comprises a plurality of output passages and switching means connected to said plurality of pipes for connecting the fluidic signals therein to said plurality of output passages or to said means for comparing, whereby, depending upon the condition of said switching means, said second fluidic digitally coded signal is numerically displayed or said first fluidic digitally coded signal is coupled to said output passages.